United States Patent

[11] 3,601,417

| [72] | Inventor | Jenö Szepesvary<br>Kufstein, Eichelwang 359/D (Tirol),<br>Austria |
|---|---|---|
| [21] | Appl. No. | 847,044 |
| [22] | Filed | Aug. 4, 1969 |
| [45] | Patented | Aug. 24, 1971 |
| [32] | Priority | Aug. 2, 1968 |
| [33] | | Austria |
| [31] | | A 7552/68 |

[54] RADIAL PACKING FOR SHAFTS
11 Claims, 8 Drawing Figs.

[52] U.S. Cl. .................................................. 277/165,
277/178, 277/181
[51] Int. Cl. .......................................................... F16j 15/32
[50] Field of Search............................................ 277/153,
165, 181–184; 277/178

[56] References Cited
UNITED STATES PATENTS
3,380,745  4/1968  Kudlaty ........................ 277/165 X
FOREIGN PATENTS
656,657  8/1951  Great Britain ................ 277/153

*Primary Examiner*—Robert I. Smith
*Attorney*—Edmund M. Jaskiewicz

ABSTRACT: A radial packing for shafts is made of a resilient material and has a housing which surrounds the shaft and has an annular groove therein. A substantially cylindrical packing element has an external supporting rib adjacent to one end thereof with this rib being positioned in the housing groove and an internal lip at the other end thereof for sealing engagement with the shaft. An O-ring of a resilient material surrounds the packing element on the rear side of the sealing lip to urge the lip into sealing engagement with the shaft.

PATENTED AUG 24 1971 3,601,417

INVENTOR
JENÖ SZEPESVARY

BY Edmund M. Jaskiewicz
ATTORNEY

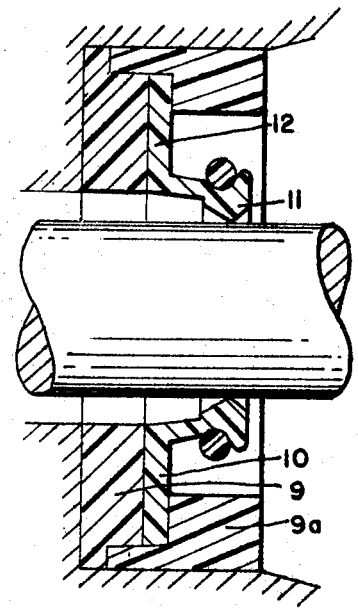
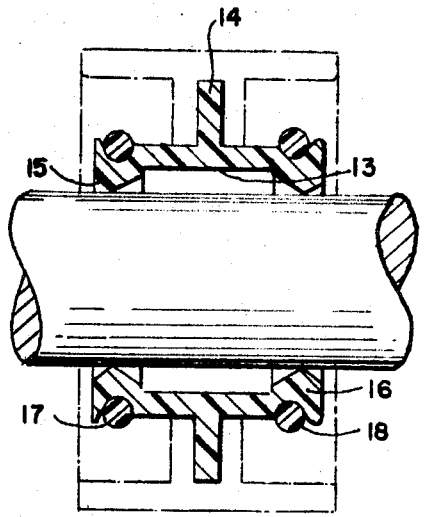
FIG.5  FIG. 6
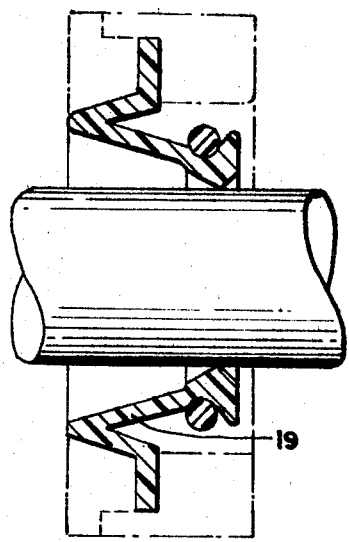
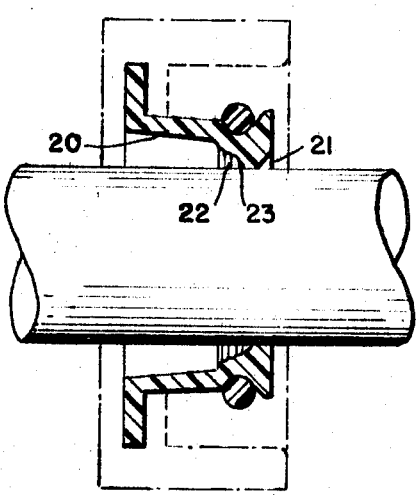
FIG.7  FIG. 8
INVENTOR
JENŐ SZEPESVARY

RADIAL PACKING FOR SHAFTS

The present invention relates to radial packings, more particularly, to a noncorrosive packing for rotary shafts and the like which can be mounted by mechanical assembly of its components.

Radial packings for shafts and the like have been made of a plastic material including rubber having metallic components and are generally manufactured, at least in part, by vulcanization. In order to obtain the necessary radial pressure of the packing against the shaft there is provided a helical spring which surrounds that portion of the packing having the sealing lips so as to urge the sealing lips into close contact with the shaft. Since there is usually a very small difference between the inner and outer diameters of such a packing this packing has the disadvantage that there is a very little space available for positioning a helical spring.

Such packings have the further disadvantage in that the metallic inserts, which may be employed in the packing, and the helical springs which are also metal are susceptible to corrosion. The construction of such packings is generally such that the packing element itself cannot be easily replaced. As a result, such packings are not economical since it is necessary to maintain a large inventory of the complete packing assembly. A further disadvantage of such packings is that known manufacturing methods are not feasible for the mass production of such packings.

It is therefore the principal object of the present invention to provide a novel and improved radial packing.

It is another object of the present invention to provide a radial packing which is simple in construction so that the packing can be economically mass produced and in which the packing element itself can be replaced without the necessity of disassembling the entire packing.

According to one aspect of the present invention there is provided a radial packing of a resilient material for a shaft. The packing may comprise housing means positioned around the shaft and having an annular groove therein facing towards the shaft periphery. A substantially cylindrical packing element has an external supporting rib adjacent one end thereof with this external rib being positioned in the annular groove of the housing means. At the other end of the packing element there is provided an internal sealing lip which is engageable with the periphery of the shaft for sealing engagement therewith. An O-ring of a resilient plastic material may be positioned around the packing element on the back side of the sealing lip so as to urge the sealing lip into closer contact with the shaft.

The objects and advantages of the present invention will be apparent upon reference to the accompanying description when taken in conjunction with the following drawings, which are exemplary, wherein;

FIGS. 4-8 are views similar to that of FIG. 1 and showing several modifications of the packing of the present invention.

Proceeding next to the drawings wherein like reference symbols indicate the same parts throughout the various views a specific embodiment and modifications of the present invention will be described in detail.

Figure 1:
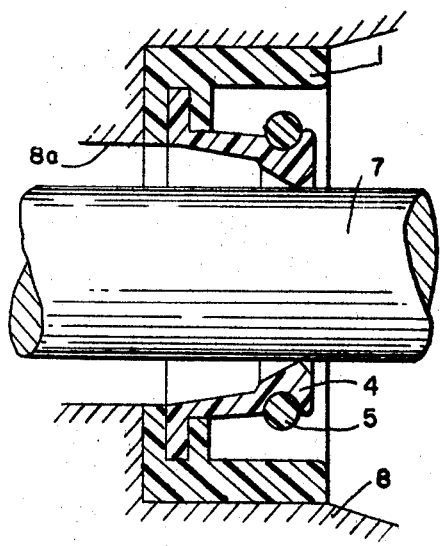
FIG. 1 is a longitudinal sectional view of an embodiment of the packing according to the present invention.
Figure 2:
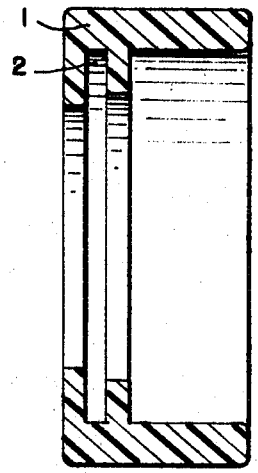
FIG. 2 is a longitudinal sectional view of the housing portion of the packing of FIG. 1.
Figure 3:
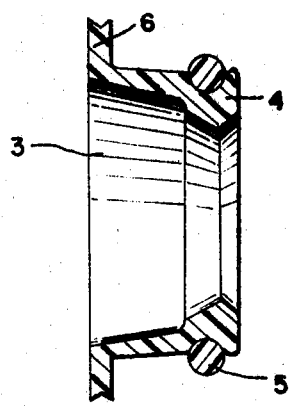
FIG. 3 is a longitudinal sectional view of the packing element portion of the packing of the FIG. 1.

As may be seen in FIG. 1 the packing according to the present invention comprises an annular housing 1, illustrated per se in FIG. 2, and formed of a resilient plastic material such as a thermosetting synthetic plastic. The housing 1 is provided with an annular groove 2 which faces the periphery of the shaft which is to be packed and designated as 7. A packing element 3 which is substantially cylindrical in form is made of a material somewhat softer than the material of the annular housing, such as a synthetic thermoplastic material. The packing element 3 is shown per se in FIG. 3. The packing element is provided with an internal sealing lip 4 adjacent one end thereof with there being an annular recess on the packing element opposite the sealing lip and an O-ring 5 being positioned in the recess. The O-ring is preferably of a synthetic resin material. The O-ring 5 thus urges the sealing lip radially inwardly into sealing engagement with the periphery of shaft 7.

At the other end of packing element 3 there is provided an annular supporting rib 6 which is at substantially a right angle to the packing element. The supporting rib 6 is positioned in the housing groove 2 and thus locates the packing element 3 within the annular housing 2. The shaft 7 which is being packed is supported by a bearing mount 8 within which the packing of the present invention is positioned. The bearing mount 8 is provided with a bore 8a through which the shaft 7 passes.

The single size housing 1 as disclosed may readily accommodate various sizes of packing element 3. Such packing elements may differ from each other with respect to shape and configuration in the sealing lip 4 and supporting rib 6. The ability of the packing of the present invention to employ various sizes and shapes of packing elements with the same size housing is of particular advantage when the shaft 7 is provided with different diameter portions passing through a constant diameter 8a. Under such circumstances a single size annular housing may be provided and various sizes and shapes of packing elements 3 may be mounted within the housing without the necessity of providing a special packing for each different diameter portion of the shaft 7.

The packing of the shaft of the present invention facilitates the replacement of those parts which are susceptible to wear such as the sealing lip 4 of the packing element 3. The packing element may be removed from the housing and new packing element assembled while the same housing can be retained for further use.

Figure 4:
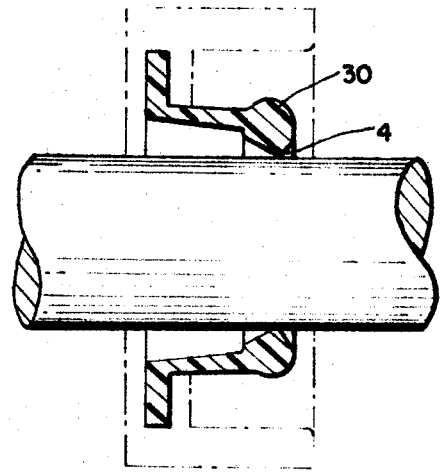

The present invention discloses the use of a synthetic resin plastic O-ring 5 in place of the conventional helical metal springs previously used in radial packing. The use of such an O-ring may be modified as shown in FIG. 4 where the O-ring is eliminated and an annular bulge or enlargement is provided on the rear side of the sealing lip 4.

In FIG. 5 is illustrated a modification of the present packing wherein an annular housing is formed of two parts 9 and 9a. These parts are joined together by a suitable process well known in the art such as by bonding through an adhesive, riveting or with the parts being provided with mating threads and then screwed together. The housing parts 9 and 9a are shaped to define an annular space 10 which corresponds to the annular groove 2 of the housing shown in FIG. 2. A packing element 11 is similarly provided with an external supporting lip 12 which is accommodated in the annular space 10.

In the modification of FIG. 6 there is disclosed a packing element 11 having a substantially T-shaped supporting structure which includes an external supporting rib 14. The T-shaped supporting structure is provided with internal sealing lips 15 and 16 at each end thereof. The sealing lips 15 and 16 may have different diameters so as to accommodate two different diameter shaft portions within the same packing element 13. This packing element 13 has the further advantage of being able to separate two different media positioned on both sides of the packing. By way of example, the shaft lubricant may be enclosed between the sealing lips 15 and 16. With the radial packings presently being used, two complete and separate packings are required for such a packing arrangement dealing with two different media. The sealing lips 15 and 16 may be urged into sealing engagement with the periphery of the shaft by O-rings 17 and 18 similar to O-ring 5 disclosed above.

In FIG. 7 there is disclosed a modification which is particularly suitable for the packing of high speed shafts. In this modification a packing element 19 is provided with a substantially V-shaped cross section and is formed of a suitable resilient material so that the resulting resilient characteristic of the packing, derived both from the V-shaped cross section and resilient material, will enable the packing element to instantly adapt to high speed vibrations of a rotating shaft while at the same time maintaining the desired packing effect with respect to the shaft.

In the modification illustrated in FIG. 8 a packing element 20 is provided with a sealing lip 21 having a plurality of helical grooves 22 and 23 on the side of sealing lip directed toward the lubricant. The helical grooves are formed in a tapering surface as shown in FIG. 8 so that proceeding in a direction toward the lip the grooves or threads progressively approach the periphery of the shaft. The threaded or grooved surface of the sealing lip significantly reduces the accumulation of a lubricant in front of the sealing lip and thus maintains the lubricant in constant motion.

The packing of the present invention does not employ any metal components in the form of supporting elements, spring elements or the like and hence is not subject to corrosion. At the same time, the packing element of the present packing can be replaced while maintaining the housing in position. It is thus not necessary to maintain a large inventory of complete packings but only of those portions of the packing which are susceptible to wear. This characteristic reduces packing maintenance costs and the simple structure of the present packing enables the packing to be readily and economically mass produced. An addition, the assembly in relation to the shaft involves a mechanical process wherein the components are merely assembled in position.

It will be understood that the present invention will be susceptible to modification in order to adapt it to different usages and conditions.

What I claim is:

1. A radial packing of resilient material for a shaft comprising a cylindrical housing positionable in a bearing mount around a shaft and having an internal flange portion therein, there being an annular groove in said internal flange portion facing toward the shaft to be packed, a cylindrical packing element having an external annular supporting rib on the outer periphery thereof and an internal annular sealing rib at one end of said packing element spaced axially from said external rib and sealingly engageable with the periphery of the shaft, the sealing edge of the internal rib being inwardly of the end of the packing element, said external supporting rib being positionable in said housing annular groove, and an O-ring removably mounted on the outer peripheral surface of said cylindrical packing element opposite said sealing rib and inwardly of the end of the packing element to urge said lip into sealing engagement with the shaft, said housing and packing elements both being of a resilient material with the material of the housing being harder than the material of the packing element.

2. A radial packing as claimed in claim 1 wherein at least a portion of said housing means is of a thermosetting plastic material.

3. A radial packing as claimed in claim 1 wherein at least a portion of said housing means is of a thermoplastic material.

4. A radial packing as claimed in claim 1 wherein at least a portion of said packing element is of a plastic.

5. A radial packing as claimed in claim 1 and comprising reinforcing elements in the material of said housing means, packing element or O-ring.

6. A radial packing as claimed in claim 1, wherein there is an annular enlargement on said packing element on the rear side of said sealing lip.

7. A radial packing as claimed in claim 1 with there being threads on the side of said sealing lip exposed to a lubricant for the shaft.

8. A radial packing as claimed in claim 7 wherein said threads are progressively closer to the shaft in the direction of the sealing lip.

9. A radial packing as claimed in claim 1 wherein said housing element comprises first and second parts with there being an annular space therebetween, said packing supporting rib being inserted into said annular space.

10. A radial packing as claimed in claim 9 wherein said housing parts are secured to each other.

11. A radial packing as claimed in claim 1 wherein said packing element has a V-shaped cross section.